US010179601B2

(12) United States Patent
Tsubaki

(10) Patent No.: US 10,179,601 B2
(45) Date of Patent: Jan. 15, 2019

(54) ELECTRIC POWER STEERING APPARATUS

(71) Applicant: NSK LTD., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/324,813

(22) PCT Filed: Aug. 4, 2015

(86) PCT No.: PCT/JP2015/072136
§ 371 (c)(1),
(2) Date: Jan. 9, 2017

(87) PCT Pub. No.: WO2016/027663
PCT Pub. Date: Feb. 25, 2016

(65) Prior Publication Data
US 2017/0217479 A1 Aug. 3, 2017

(30) Foreign Application Priority Data

Aug. 22, 2014 (JP) .................................. 2014-169511
Aug. 22, 2014 (JP) .................................. 2014-169512

(51) Int. Cl.
B62D 5/04 (2006.01)
B62D 15/02 (2006.01)
(Continued)

(52) U.S. Cl.
CPC ......... B62D 5/0463 (2013.01); B62D 5/0412 (2013.01); B62D 5/0466 (2013.01); B62D 6/008 (2013.01); B62D 15/021 (2013.01)

(58) Field of Classification Search
CPC ... B62D 15/021; B62D 5/0412; B62D 5/0463
(Continued)

(56) References Cited

U.S. PATENT DOCUMENTS 5,398,953 A * 3/1995 Shimizu ............... B62D 5/0463
180/446
6,184,637 B1 * 2/2001 Yamawaki ........... B62D 5/0466
318/432
(Continued)

FOREIGN PATENT DOCUMENTS

JP 2002-104210 A 4/2002
JP 2005-125890 A 5/2005
(Continued)

OTHER PUBLICATIONS

International Search Report for PCT/JP2015/072136, dated Nov. 2, 2015.

Primary Examiner — Tyler J Lee
(74) Attorney, Agent, or Firm — Sughrue Mion, PLLC

(57) ABSTRACT

An electric power steering apparatus that enables implementation of a desired steering torque without being affected by a state of a road surface by controlling a steering torque so as to become a value corresponding a steering angle and a steering angular velocity. The apparatus includes a SAT compensation value calculating section that calculates a SAT compensation value based on a SAT value; and a steering reaction compensation value calculating section that calculates a steering reaction compensation value based on the SAT compensation value, a steering angle and a steering angular velocity, and corrects the current command value by the steering reaction compensation value. Further, an electric power steering apparatus controls a twist angle of a torsion bar so as to follow a value corresponding to a steered angle.

10 Claims, 12 Drawing Sheets

(51) Int. Cl.
*B62D 6/08* (2006.01)
*B62D 6/00* (2006.01)

(58) Field of Classification Search
USPC ...................................... 701/41–43
See application file for complete search history.

(56) References Cited

U.S. PATENT DOCUMENTS

| | | | | |
|---|---|---|---|---|
| 6,278,922 | B1* | 8/2001 | Nishiwaki | B62D 1/28 180/197 |
| 6,459,971 | B1* | 10/2002 | Kurishige | B62D 5/0466 180/443 |
| 8,494,715 | B2* | 7/2013 | Kariatsumari | B62D 5/0472 318/400.32 |
| 9,802,644 | B2* | 10/2017 | Nakamura | B62D 6/00 |
| 2002/0092700 | A1* | 7/2002 | Kim | B60T 7/12 180/446 |
| 2005/0209752 | A1* | 9/2005 | Ono | B62D 5/008 701/41 |
| 2006/0086560 | A1* | 4/2006 | Furusho | B62D 5/0463 180/446 |
| 2010/0228440 | A1* | 9/2010 | Yamazaki | B62D 5/0466 701/41 |
| 2011/0036660 | A1* | 2/2011 | Kojo | B62D 5/008 180/446 |
| 2011/0098888 | A1* | 4/2011 | Kariatsumari | B62D 5/046 701/41 |
| 2011/0218708 | A1* | 9/2011 | Ono | B62D 6/008 701/42 |
| 2011/0231065 | A1* | 9/2011 | Kushiro | B62D 6/007 701/41 |
| 2012/0123643 | A1* | 5/2012 | Limpibuntering | B62D 1/286 701/42 |
| 2012/0199414 | A1* | 8/2012 | Shimizu | B62D 5/0463 180/446 |
| 2013/0238196 | A1* | 9/2013 | Seto | B62D 5/0472 701/42 |
| 2016/0001814 | A1* | 1/2016 | Endo | B62D 5/0466 701/41 |

FOREIGN PATENT DOCUMENTS

| | | |
|---|---|---|
| JP | 2008-018825 A | 1/2008 |
| JP | 2009-143366 A | 7/2009 |
| JP | 5074971 B2 | 11/2012 |
| JP | 5208894 B2 | 6/2013 |

* cited by examiner

PRIOR ART

PRIOR ART

FIG.9A STEERING PATTERN
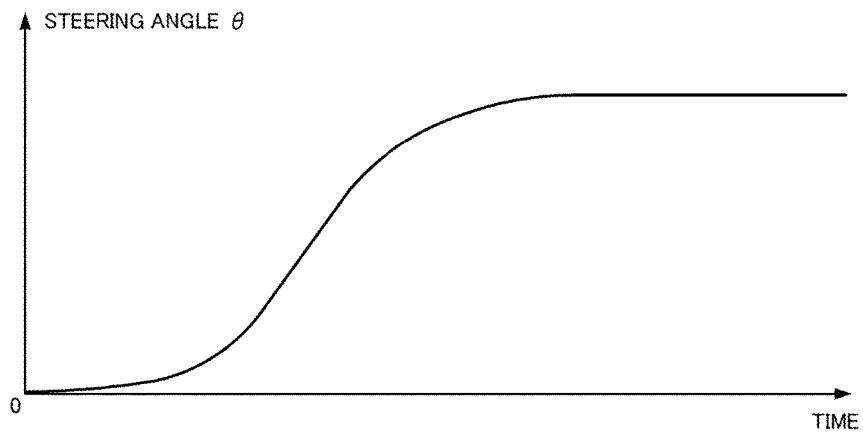
FIG.9B PRIOR ART
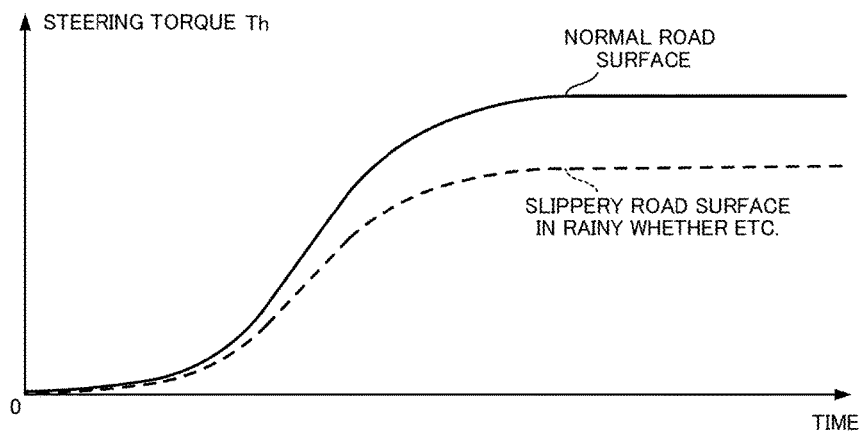
FIG.9C PRESENT INVENTION
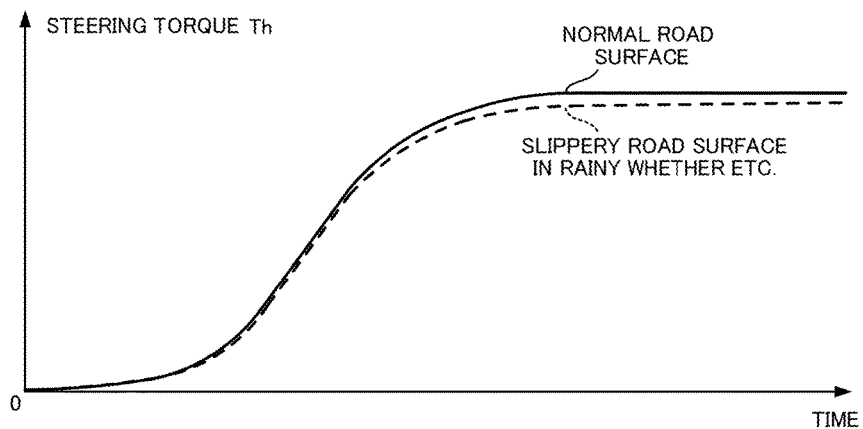

ELECTRIC POWER STEERING APPARATUS

This is a National Stage of International Application No. PCT/JP2015/072136 filed Aug. 4, 2015, claiming priority based on Japanese Patent Application No. 2014-169511 filed Aug. 22, 2014 and Japanese Patent Application No. 2014-169512 filed Aug. 22, 2014, the contents of all of which are incorporated herein by reference in their entirety.

TECHNICAL FIELD

The present invention relates to an electric power steering apparatus that drives a motor by a current command value calculated on the basis of a steering torque and a vehicle speed, and provides a steering system of a vehicle with an assist torque, and in particular to a high-performance electric power steering apparatus that enables implementation of a steering torque equivalent to a steering angle and a steering angular velocity or to a steered angle without being affected by a state of a road surface by correcting the current command value using a steering reaction compensation value calculated on the basis of the steering angle, the steering angular velocity and a self-aligning torque (SAT) compensation value, or by controlling a twist angle of a torsion bar so as to follow a value corresponding to the steered angle.

BACKGROUND ART

An electric power steering apparatus (EPS) which provides a steering system of a vehicle with an assist torque by means of a rotational torque of a motor, applies a driving force of the motor as the assist torque to a steering shaft or a rack shaft by means of a transmission mechanism such as gears or a belt through a reduction mechanism. In order to accurately generate the assist torque, such a conventional electric power steering apparatus performs feedback control of a motor current. The feedback control adjusts a voltage supplied to the motor so that a difference between a current command value and a detected motor current value becomes small, and the adjustment of the voltage supplied to the motor is generally performed by an adjustment of duty command values of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque of the steering wheel 1, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command on the basis of a steering torque Th detected by the torque sensor 10 and a vehicle speed Vel detected by a vehicle speed sensor 12, and controls a current supplied to the motor 20 by means of a voltage control value Vref obtained by performing compensation or the like to the calculated current command value. A steering angle sensor 14 is not essential, it does not need to be provided, and it is possible to obtain the steering angle from a rotation sensor such as a resolver connected to the motor 20.

A controller area network (CAN) 40 exchanging various information of a vehicle is connected to the control unit 30, and it is possible to receive the vehicle speed Vel from the CAN 40. Further, it is also possible to connect a non-CAN 41 exchanging a communication, analog/digital signals, a radio wave or the like except with the CAN 40 to the control unit 30.

In such an electric power steering apparatus, the control unit 30 mainly comprises a CPU (including an MPU and an MCU), and general functions performed by programs within the CPU are, for example, shown in FIG. 2.

Functions and operations of the control unit 30 will be described with reference to FIG. 2. As shown in FIG. 2, the steering torque Th from the torque sensor 10 and the vehicle speed Vel from the vehicle speed sensor 12 are inputted into a current command value calculating section 31. The current command value calculating section 31 calculates a current command value Iref1 on the basis of the steering torque Th and the vehicle speed Vel and by using an assist map or the like. The calculated current command value Iref1 is added in an adding section 32A to a compensation signal CM from a compensating section 34 for improving a characteristic. A current limiting section 33 limits a maximum value of the current command value Iref2 to which the compensation signal CM has been added. The current command value Irefm of which the maximum value has been limited is inputted into a subtracting section 32B, where a detected motor current value Im is subtracted from the current command value Irefm.

Proportional integral (PI) control to a deviation I (=Irefm−Im) which is the subtraction result in the subtracting section 32B is performed in a PI control section 35. The voltage control value Vref obtained by the PI control is inputted into a PWM control section 36, which calculates duty command values, and PWM-drives the motor 20 through an inverter circuit 37 by means of a PWM signal. The motor current value Im of the motor 20 is detected by a motor current detector 38, and is inputted and fed back to the subtracting section 32B. Further, a rotation sensor 21 such as a resolver is connected to the motor 20, and a steering angle θ is outputted.

The compensating section 34 adds a detected or estimated self-aligning torque (SAT) to an inertia compensation value 342 in an adding section 344, further, adds a convergence control value 341 to the addition result in an adding section 345, and outputs the addition result obtained in the adding section 345 as the compensation signal CM to the adding section 32A so as to improve a characteristic of the current command value.

Thus, the conventional electric power steering apparatus detects the steering torque that a driver manually adds as a twist torque of a torsion bar by means of the torque sensor, and mainly controls the motor current as an assist current corresponding to the torque. Therefore, the steering torque may vary in accordance with the steering angle by a difference of a state of a road surface (for example, a slope, a low μ road, etc.).

THE LIST OF PRIOR ART DOCUMENTS

Patent Documents

Patent Document 1: Japanese Patent No. 5074971 B2
Patent Document 2: Japanese Patent No. 5208894 B2

SUMMARY OF THE INVENTION

Problems to be Solved by the Invention

What is shown in the publication of Japanese Patent No. 5074971 B2 (Patent Document 1) is a prior art proposing an electric power steering apparatus that achieves the steering torque equivalent to the steering angle without being affected by the state of the road surface. The electric power steering apparatus disclosed in Patent Document 1 suppresses a change of a hysteresis width while maintaining on-center feeling of the steering torque by considering a reaction torque on a steering shaft (which is the SAT). In order to make steering feeling good, the electric power steering apparatus comprises a steering shaft reaction torque detecting means for detecting the reaction torque on the steering shaft and a steering state judging means for judging at least a returning state, and corrects a basic assist command value on the basis of the reaction torque on the steering shaft so as to increase the basic assist command value when the state is judged as the returning state.

However, the electric power steering apparatus disclosed in Patent Document 1 has a problem that it does not enable implementation of the steering torque corresponding to the steering angle and a steering angular velocity without being affected by the state of the road surface because it deals with the reaction torque on the steering shaft (which is the SAT) and does not consider the steering angle and the steering angular velocity.

Further, an electric power steering apparatus shown in the publication of Japanese Patent No. 5208894 B2 (Patent Document 2) has a problem that smoothness is bad, its operation is not stable and followability to a target value is not good since the electric power steering apparatus makes a calculation result by proportional integral (PI) control to a deviation between a target value of a steering torque (a twist angle) and the steering torque to be a current command value.

The present invention has been developed in view of the above-described circumstances, and the object of the present invention is to provide an electric power steering apparatus that enables implementation of a steering torque equivalent to a steering angle and a steering angular velocity without being affected by a state of a road surface by controlling the steering torque so as to become a value corresponding to the steering angle and the steering angular velocity or by controlling a twist angle of a torsion bar so as to follow a value corresponding to a steered angle.

Means for Solving the Problems

The present invention relates to an electric power steering apparatus that assists and controls a steering system by driving a motor based on a current command value calculated based on a steering torque and a vehicle speed, the above-described object of the present invention is achieved by that comprising: a SAT compensation value calculating section that calculates a SAT compensation value based on a SAT value; and a steering reaction compensation value calculating section that calculates a steering reaction compensation value based on the SAT compensation value, a steering angle and a steering angular velocity; wherein the electric power steering apparatus corrects the current command value by the steering reaction compensation value.

The above-described object of the present invention is more effectively achieved by that wherein the steering reaction compensation value calculating section comprises a virtual spring constant gain sect ion that inputs the steering angle and calculates a spring component compensation value, a virtual damper constant gain section that inputs the steering angular velocity and calculates a damper component compensation value, an adding section that calculates a spring-damper component compensation value by adding the spring component compensation value and the damper component compensation value, and a subtracting section that calculates the steering reaction compensation value by subtracting the spring-damper component compensation value from the SAT compensation value; or wherein the SAT compensation value calculating section comprises a SAT estimating section that obtains the SAT value based on the steering torque, a motor angular velocity, a motor angular acceleration and the current command value, a filter that eliminates noise of the SAT value, and a gain section that outputs the SAT compensation value by multiplying an output of the filter by a gain; or wherein the filter and the gain section are vehicle speed sensitive; or wherein the virtual spring constant gain section and the virtual damper constant gain section are vehicle speed sensitive; or wherein the correction is adding the steering reaction compensation value to the current command value.

Further, the present invention relates to an electric power steering apparatus that drives a motor based on a motor current command value, and assists and controls a steering system by driving and controlling the motor, the above-described object of the present invention is achieved by that wherein the electric power steering apparatus calculates the motor current command value by calculation for twist angle control based on a deviation between a target twist angle corresponding to a steered angle and an actual twist angle of the steering system and the actual twist angle, and controls the actual twist angle so as to follow a value corresponding to the steered angle.

The above-described object of the present invention is more effectively achieved by that wherein the target twist angle is calculated by a twist angle table inputting the steered angle; or wherein the twist angle table is vehicle speed sensitive; or wherein the calculation for twist angle control is performed by a subtracting section that obtains a deviation between the target twist angle and the actual twist angle, a position control section that outputs the target twist angular velocity by performing position control of the deviation, a differentiating section that differentiates the actual twist angle, and a velocity control section that inputs the target twist angular velocity and an output of the differentiating section and performs velocity control; or wherein the velocity control section performs at least one among P control calculation, I control calculation and D control calculation, or combinations of them; or wherein a limiter is provided in a post-stage of the velocity control section; or wherein the electric power steering apparatus adds a current command value of assist control, a current command value of a SAT estimation value, or a current command value for restraint of steering wheel vibration to the motor current command value.

Effects of the Invention

The electric power steering apparatus of the present invention enables constant steering feeling to be obtained without being affected by a state of a road surface since it considers the SAT and performs correction of a reaction corresponding to the steered angle (the steering angle) and the steering angular velocity. The electric power steering apparatus enables implementation of a desired steering torque because of controlling the steering torque so as to become a value corresponding to the steering angle and the steering angular velocity.

Further, the electric power steering apparatus of the present invention enables implementation of the steering torque equivalent to the steered angle and enables constant steering feeling to be obtained without being affected by the state of road surface since it controls a twist angle of a torsion bar so as to follow a value corresponding to the steered angle. Position control to the deviation between the target value of the twist angle and the actual twist angle and velocity control to the target twist angular velocity and the twist angular velocity using at least one of PID controls enable smooth and stable operation, and there are advantages that followability to the target value is good and a steady deviation barely remains.

BRIEF DESCRIPTION OF THE DRAWINGS

In the accompanying drawings:

FIGS. 9A, 9B and 9C are characteristic diagrams showing the operating example (the first embodiment) of the present invention compared with a prior art;

MODE FOR CARRYING OUT THE INVENTION

In order to obtain constant steering feeling by achieving a steering torque equivalent to a steering angle (a steered angle) and a steering angular velocity or to the steered angle without being affected by a state of a road surface, the present invention achieves a desired steering torque respectively by obtaining a spring-damper component compensation value by means of the steering angle and the steering angular velocity, in addition, calculating a steering reaction compensation value on the basis of a SAT compensation value and the spring-damper component compensation value, and correcting a current command value by means of the steering reaction compensation value, or by controlling a twist angle of a torsion bar so as to follow a value corresponding to the steered angle.

In the present invention, it is possible to obtain the constant steering feeling without being affected by the state of the road surface because of performing correction of a reaction corresponding to the steered angle (the steering angle) and the steering angular velocity, considering a SAT being a road-surface reaction. Further, the present invention enables stable control with high accuracy because of calculating a motor current command value through a position control section and a velocity control section including at least one of PID controls using a deviation between a target value of a twist angle calculated depending on the steered angle and an actual twist angle detected from the torsion bar.

Hereinafter, an embodiment of the present invention will be described with reference to the accompanying drawings.

Figure 1:
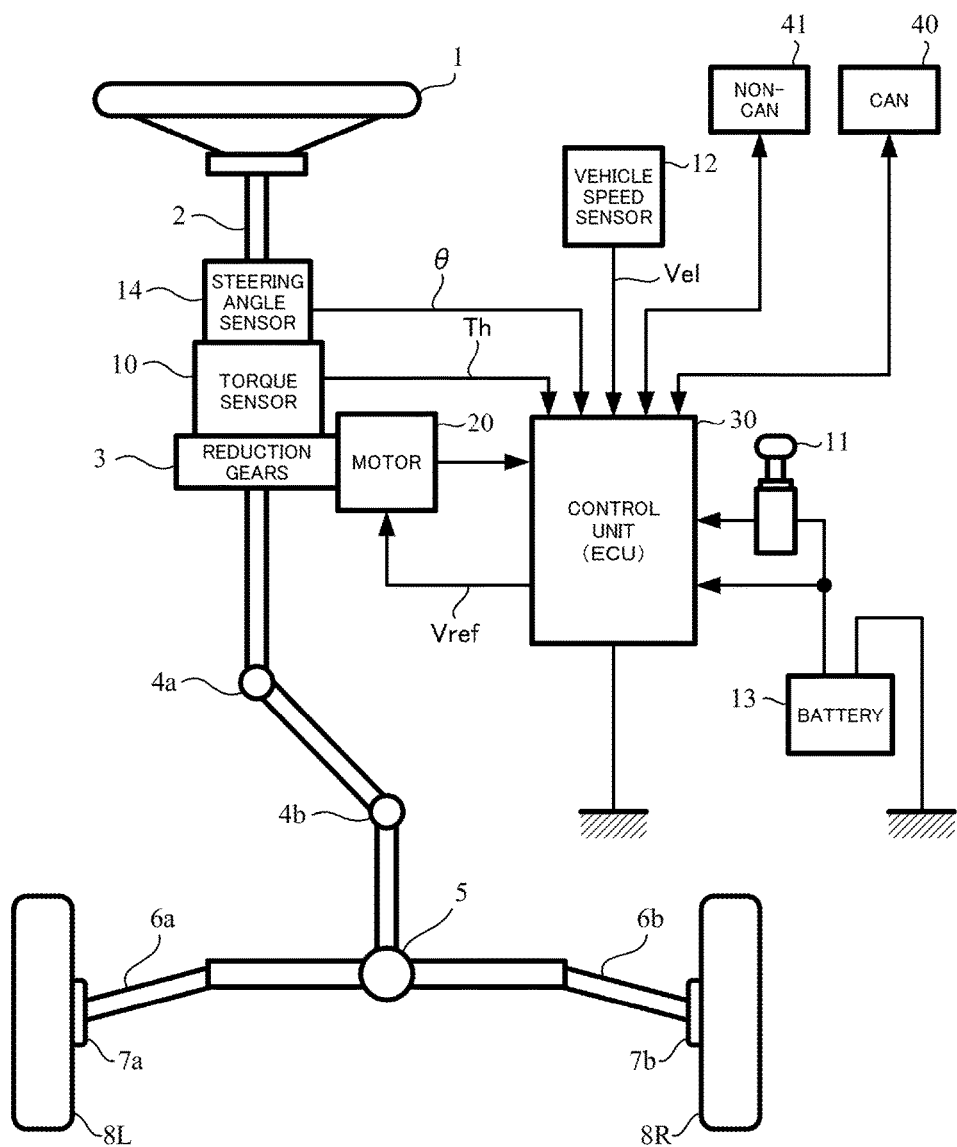
FIG. 1 is a configuration diagram illustrating a general outline of an electric power steering apparatus.
Figure 2:
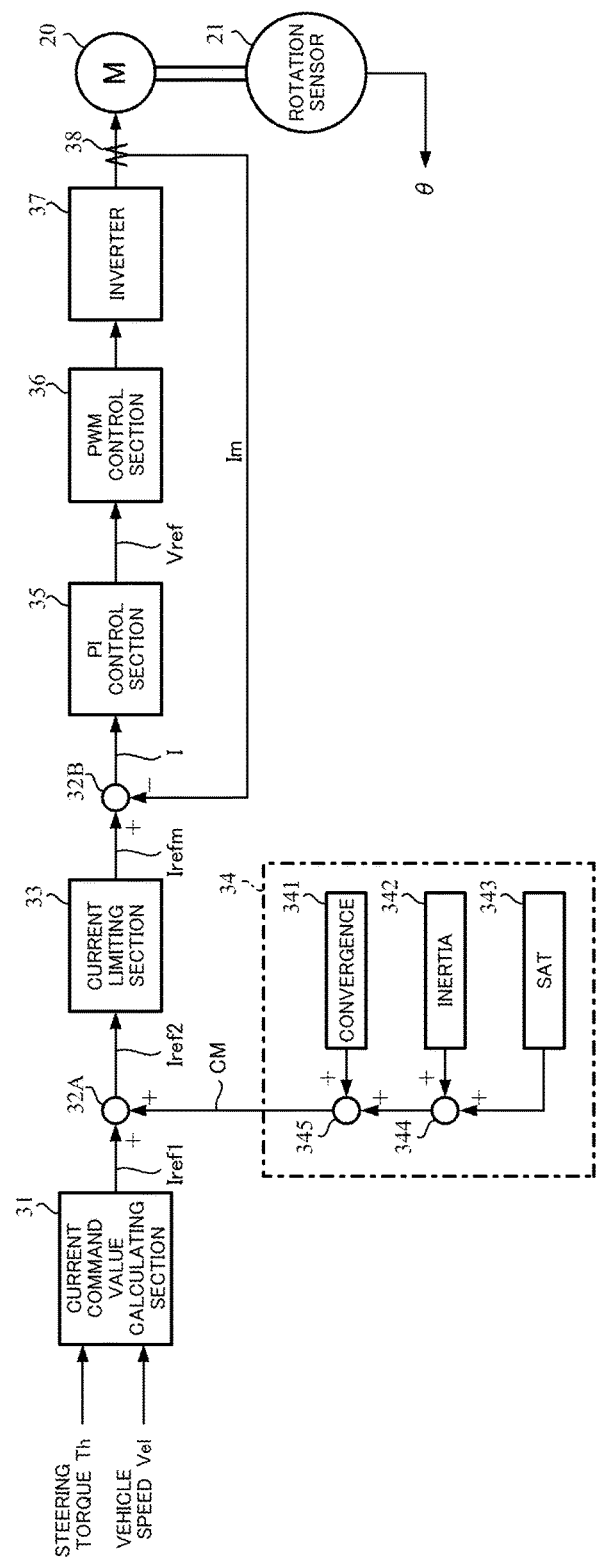
FIG. 2 is a block diagram showing a configuration example of a control system of the electric power steering apparatus.
Figure 3:
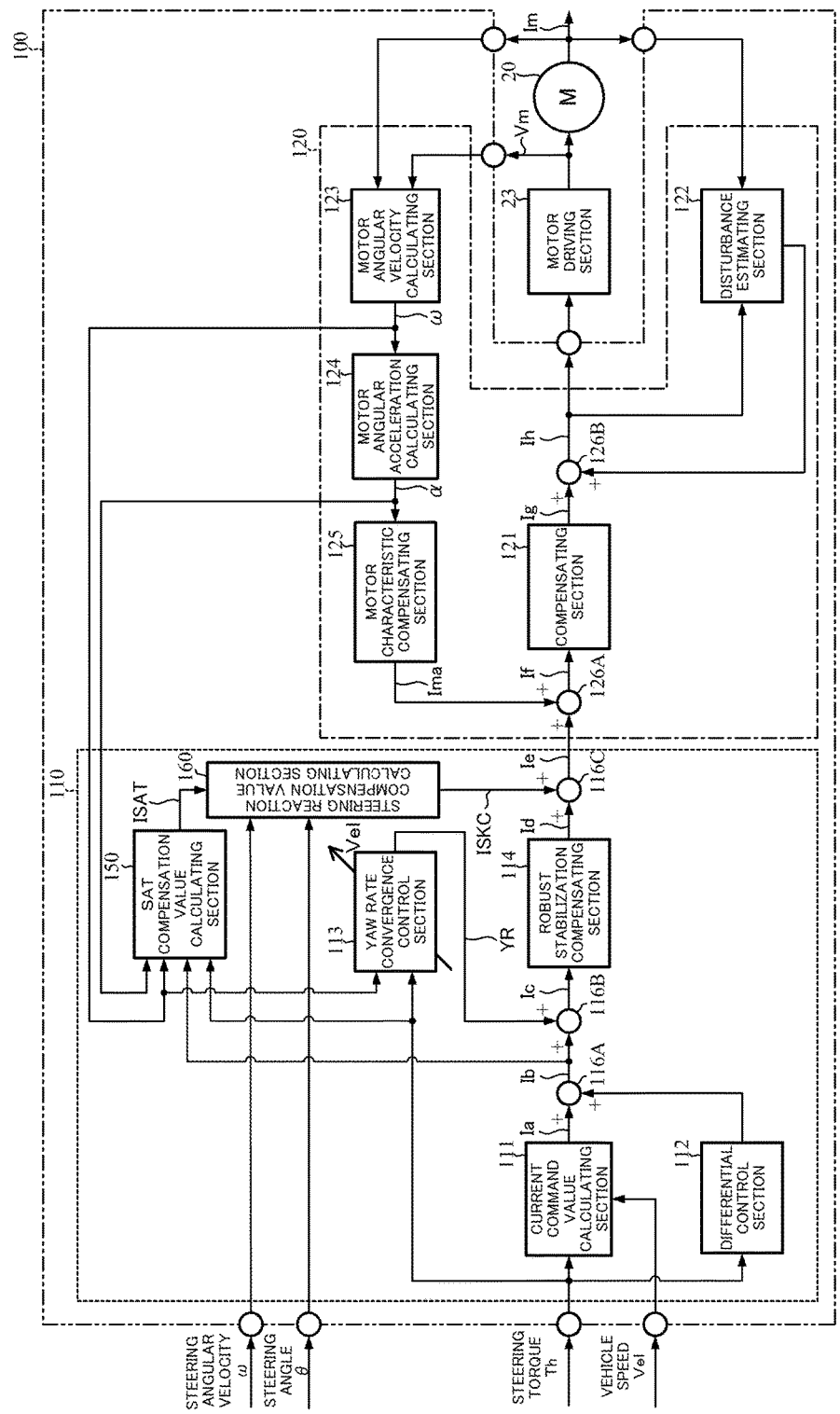
FIG. 3 is a block diagram showing a configuration example (a first embodiment) of the present invention.

FIG. 3 shows a configuration example (a first embodiment) of the present invention. A control unit 100 comprises a torque system control section 110, shown by a broken line, that performs control by using a steering torque Th, a vehicle speed Vel, a steering angle θ, a steering angular velocity (a motor angular velocity) ω and a steering angular acceleration (a motor angular acceleration) α, and a motor system control section 120, shown by a dashed line, that performs control related to driving a motor 20 by means of a motor driving section 23 comprising an inverter or the like.

The torque system control section 110 comprises a current command value calculating section 111, a differential control section 112, a yaw rate convergence control section 113, a robust stabilization compensating section 114, a self-aligning torque (SAT) compensation value calculating section 150 and a steering reaction compensation value calculating section 160, and includes adding sections 116A and 116B and a subtracting section 116C. Further, the motor system control section 120 comprises a compensating section 121, a disturbance estimating section 122, a motor angular velocity calculating section 123, a motor angular acceleration calculating section 124 and a motor characteristic compensating section 125, and includes adding sections 126A and 126B.

The steering torque Th is inputted into the current command value calculating section 111, the differential control section 112, the yaw rate convergence control section 113 and the SAT compensation value calculating section 150. The vehicle speed Vel is inputted into the current command value calculating section 111, and the yaw rate convergence control section 113 inputs the vehicle speed Vel as a parameter. The current command value calculating section 111 calculates a current command value Ia on the basis of the steering torque Th and the vehicle speed Vel. The differential control section 112 has a function that enhances responsiveness of control near a neutral position of a steering and achieves smooth steering. An output of the differential control section 112 is added to the current command value Ia in the adding section 116A, and a current command value Ib that is the addition result is inputted into the SAT compensation value calculating section 150, and is inputted into the adding section 116B.

The yaw rate convergence control section 113 inputs the steering torque Th and the steering angular velocity ω, and puts a brake on a motion that a steering wheel sways and turns in order to improve convergence of a yaw of a vehicle. A yaw rate signal YR of the yaw rate convergence control section 113 is added to the current command value Ib in the adding section 116B, and a current command value Ic that is the addition result is inputted into the robust stabilization compensating section 114.

Further, the SAT compensation value calculating section 150 inputs the steering torque Th, the current command value Ib from the adding section 116A, the steering angular velocity ω from the motor angular velocity calculating section 123 and the steering angular acceleration α from the motor angular acceleration calculating section 124, estimates a SAT value, performs signal processing of the estimated SAT value by using a filter and a gain section, and outputs a SAT compensation value ISAT that gives appropriate information of a road surface to the steering wheel as reaction force. The SAT compensation value ISAT is inputted into the steering reaction compensation value calculating section 160, the steering angle θ and the steering angular velocity ω have been, in addition, inputted into the steering reaction compensation value calculating section 160, and a calculated steering reaction compensation value ISKC is inputted into the adding section 116C.

Further, the current command value Ic obtained by addition of the adding section 116B is inputted into the robust stabilization compensating section 114. The robust stabilization compensating section 114 is, for example, a compensation section shown in Japanese Published Unexamined Patent Application No. H8-290778 A, eliminates a peak value in a resonance frequency of a resonance system consisting of an inertia element and a spring element, included by a detected torque, and compensates a phase shift of the resonance frequency that impairs responsiveness and stability of a control system. A current command value Id being an output of the robust stabilization compensating section 114 is added to the steering reaction compensation value ISKC in the adding section 116C, and an added current command value Ie is inputted into the adding section 126A within the motor system control section 120.

The motor angular velocity calculating section 123 within the motor system control section 120 calculates the steering angular velocity (the motor angular velocity) ω on the basis of an inter-motor-terminal voltage Vm and a motor current Im, and the steering angular velocity ω is inputted into the motor angular acceleration calculating section 124, the yaw rate convergence control section 113 and the SAT compensation value calculating section 150. The motor angular acceleration calculating section 124 calculates the steering angular acceleration α on the basis of the inputted steering angular velocity ω, and the steering angular acceleration α is inputted into the motor characteristic compensating section 125 and the SAT compensation value calculating section 150. A motor characteristic signal Ima from the motor characteristic compensating section 125 is added to the current command value Ie in the adding section 126A, and a current command value If being the addition result is inputted into the compensating section 121 consisting of a differential compensator or the like. A signal obtained by adding an output of the disturbance estimating section 122 in the adding section 126B to a current command value Ig compensated in the compensating section 121 is inputted into the motor driving section 23 and the disturbance estimating section 122.

The disturbance estimating section 122 is such an apparatus as shown in Japanese Published Unexamined Patent Application No. H8-310417 A, enables maintenance of a motor control characteristic desired in output criteria of the control system, and does not allow losing stability of the control system, based on a current command value Ih obtained by adding the output of the disturbance estimating section 122 to the current command value Ig that is a control target of a motor output and is compensated in the compensating section 121, and based on the motor current Im.

Figure 4:
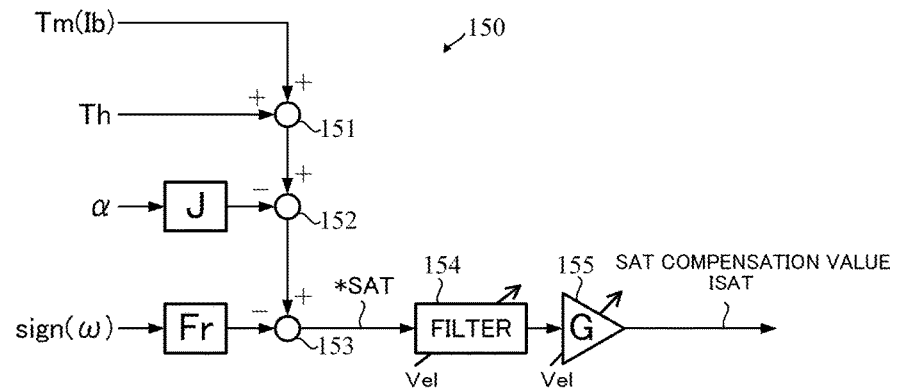
FIG. 4 is a block diagram showing a configuration example of a SAT compensation value calculating section.

FIG. 4 shows a configuration example of the SAT compensation value calculating section 150, which adds the current command value Ib corresponding to an assist torque Tm and the steering torque Th in an adding section 151, subtracts a signal obtained by multiplying the steering angular acceleration α by a motor inertia J from the addition result in a subtracting section 152, and, moreover, subtracts a signal obtained by multiplying a static friction Fr by a positive or negative sign of the steering angular velocity ω from the subtraction result in a subtracting section 153. The subtraction result of the subtracting section 153 is a SAT estimation value *SAT (for example, shown in Japanese Published Unexamined Patent Application No. 2008-18825 A). The SAT estimation value *SAT is inputted into a filter 154 that is sensitive to a vehicle speed and has a frequency characteristic, moreover, is multiplied by a gain in a gain section 155 being sensitive to a vehicle speed, so that the SAT compensation value ISAT is obtained.

Moreover, the filter 154 is a phase delay filter having a gain that makes the magnitude of the SAT estimation value *SAT decreased to a necessary and sufficient value as a static characteristic gain. Further, the gain section 155 has a function that makes the SAT compensation value ISAT small in such a case that importance of information about a road surface is relatively low as static steering or a low speed running.

Figure 5:
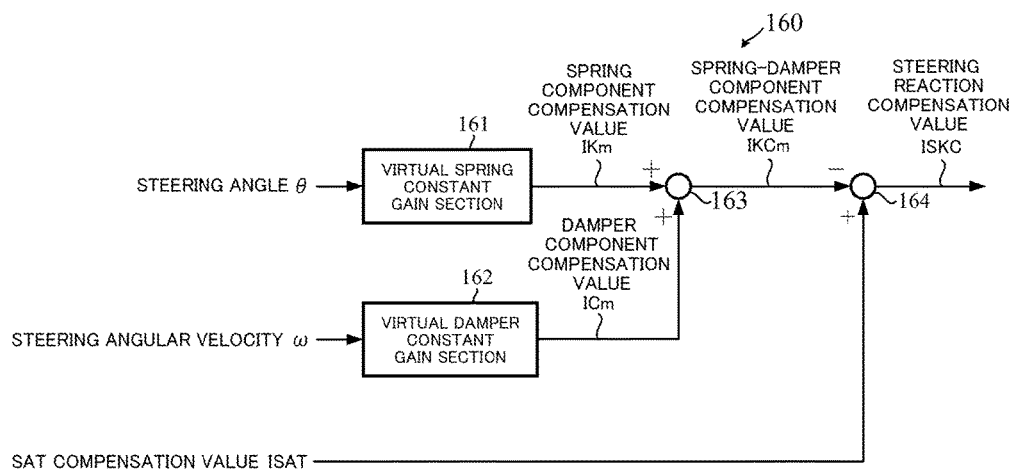
FIG. 5 is a block diagram showing a configuration example of a steering reaction compensation value calculating section.

FIG. 5 shows a configuration example of the steering reaction compensation value calculating section 160. The steering angle θ is inputted into a virtual spring constant gain section 161, for example, having a vehicle speed sensitive characteristic shown in FIG. 6, and the steering angular velocity ω is inputted into a virtual damper constant gain section 162, for example, having a vehicle speed sensitive characteristic shown in FIG. 7. A spring component compensation value IKm from the virtual spring constant gain section 161 and a damper component compensation value ICm from the virtual damper constant gain section 162 are added in an adding section 163, and a spring-damper component compensation value IKCm being the addition result is subtraction-inputted into a subtracting section 164. The SAT compensation value ISAT from the SAT compensation value calculating section 150 has been addition-inputted into the subtracting section 164, the subtraction result (=ISAT−IKCm) of the subtracting section 164 is outputted as the steering reaction compensation value ISKC, and the steering reaction compensation value ISKC is inputted into the adding section 116C.

Figure 6:
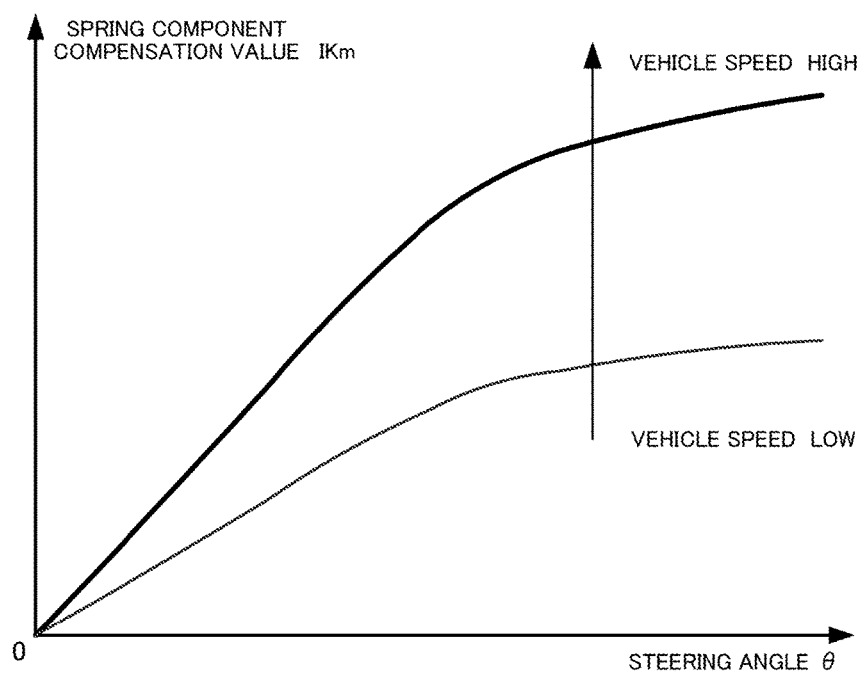
FIG. 6 is a characteristic diagram showing an example of characteristics of a virtual spring constant gain section.
Figure 7:
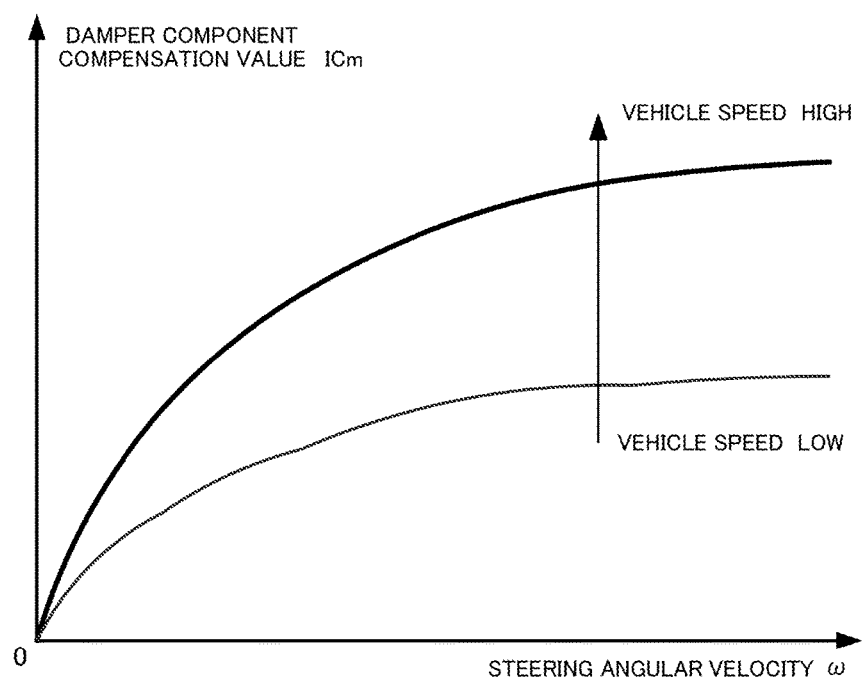
FIG. 7 is a characteristic diagram showing an example of characteristics of a virtual damper constant gain section.

Moreover, the virtual spring constant gain section 161 is sensitive to the vehicle speed in FIG. 6, but may not be sensitive to the vehicle speed. Similarly, the virtual damper constant gain section 162 is sensitive to the vehicle speed in FIG. 7, but may not be sensitive to the vehicle speed.

Figure 8:
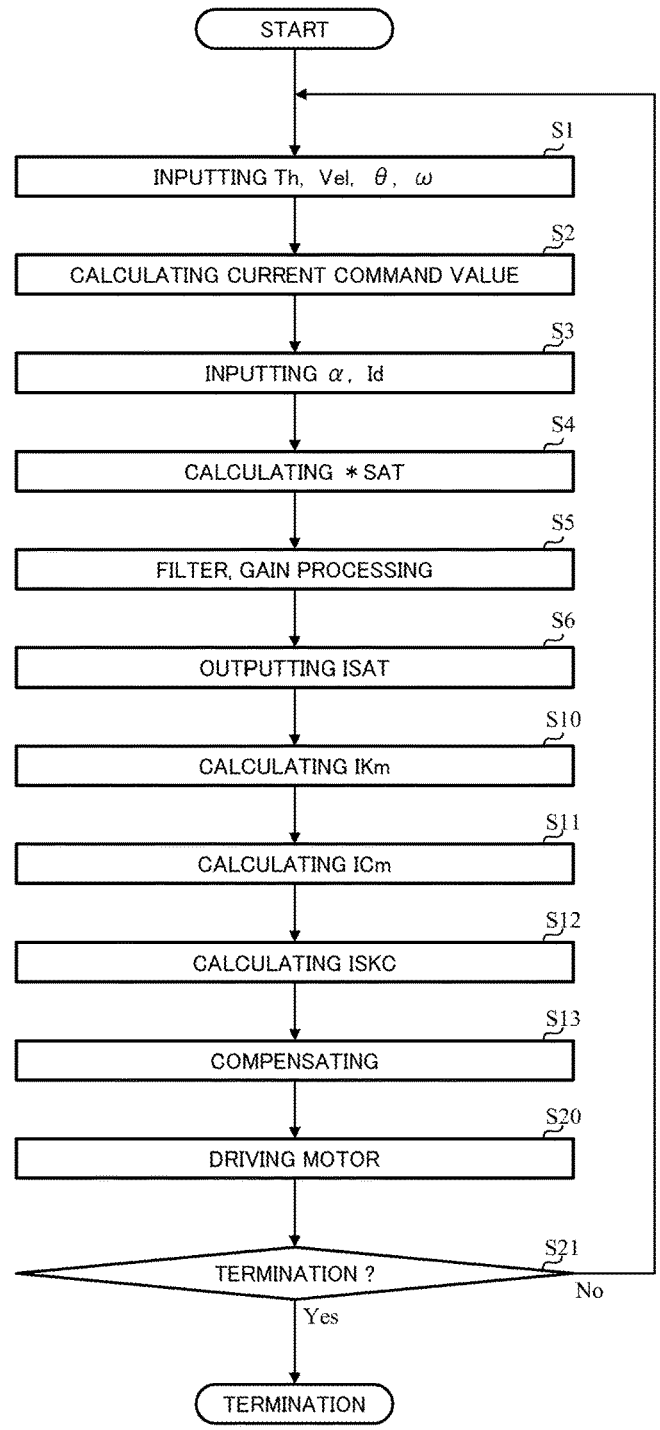
FIG. 8 is a flowchart showing an operating example (the first embodiment) of the present invention.

An operation example (the first embodiment) of such a configuration will be described with reference to a flowchart shown in FIG. 8.

First, the steering torque Th, the vehicle speed Vel, the steering angle θ and the steering angular velocity ω are inputted (Step S1). The current command value Ib is calculated in the current command value calculating section 111, the differential control section 112, etc. (Step S2), in addition, the yaw rate signal YR is calculated in the yaw rate convergence control section 113, and the current command value Ic to which the yaw rate signal YR has been added is outputted as the current command value Id through the robust stabilization compensating section 114.

The current command value Ib and the steering angular acceleration α calculated in the motor angular acceleration calculating section 124 are inputted into the SAT compensation value calculating section 150 (Step S3), and the SAT estimation value *SAT is calculated in the adding sections 151 and 152 and the subtracting section 153 (Step S4). The SAT estimation value *SAT is subjected to the filter processing and the gain processing in the filter 154 and the gain section 155 (Step S5), and the SAT compensation value ISAT is outputted and inputted into the steering reaction compensation value calculating section 160 (Step S6).

The steering reaction compensation value calculating section 160 calculates the spring component compensation value IKm in the virtual spring constant gain section 161 depending on the steering angle θ (Step S10), calculates the damper component compensation value ICm in the virtual damper constant gain section 162 depending on the steering angular velocity ω (Step S11), moreover, adds the spring component compensation value IKm and the damper component compensation value ICm in the adding section 163, and calculates and outputs the steering reaction compensation value ISKC by subtracting the spring-damper component compensation value IKCm being the addition result from the SAT compensation value ISAT (Step S12).

The steering reaction compensation value ISKC is inputted into the adding section 116C, is added to the current command value Id, moreover, is added to the motor characteristic signal Ima in the adding section 126A, and drives the motor 20 through the compensating section 121 and the motor driving section 23 (Step S20). The above operations are repeated until termination (Step S21).

FIGS. 9A, 9B and 9C are characteristic diagrams showing the operating example (the first embodiment) of the present invention. In the case of changing the steering angle θ in accordance with a steering pattern shown in FIG. 9A, a prior art causes a characteristic having a large difference shown by the solid line (a normal road) and the broken line (a slippery road surface in rainy weather etc. or a low μ road) in FIG. 9B, however, the present invention causes an almost constant characteristic regardless of a road surface as shown by the solid line (the normal road) and the broken line (the slippery road surface in rainy weather etc. or the low μ road) in FIG. 9C because of controlling the steering torque so as to become a value corresponding the steering angle and the steering angular velocity by the compensation of the steering reaction.

Moreover, the SAT compensation value may be calculated by directly processing a value obtained by detecting force on a rack shaft or torque on an intermediate shaft in the filter and the gain section. Further, the steering angle may be detected by an angle sensor installed on the steering wheel side or an angle sensor installed on the column side, or may be calculated by means of a motor angle.

Next, a second embodiment will be described that achieves a desired steering torque by controlling a twist angle of a torsion bar so as to follow a value corresponding to a steered angle in order to obtain constant steering feeling by achieving a steering torque equivalent to the steered angle.

Figure 10:
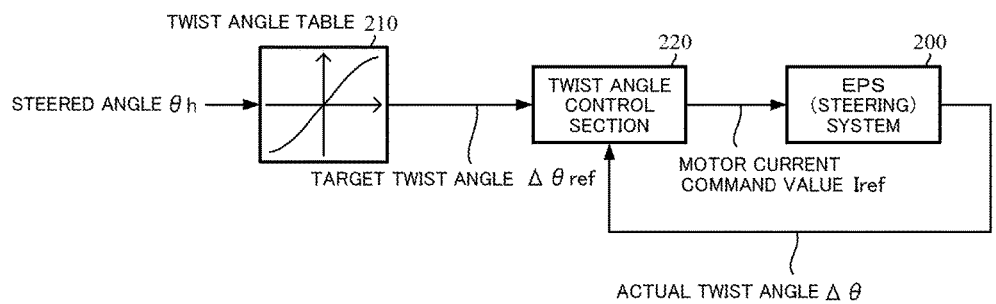
FIG. 10 is a block diagram showing a configuration example (a second embodiment) of the present invention.

FIG. 10 shows the second embodiment of the present invention. A steered angle θh is inputted into a twist angle table 210, and a target twist angle Δθref calculated in the twist angle table 210 depending on the steered angle θh is inputted into a twist angle control section 220. An actual twist angle Δθ of a torsion bar in an EPS (steering) system 200 is inputted into the twist angle control section 220. The twist angle control section 220 calculates a motor current command value Iref depending on a deviation between the target twist angle Δθref and the actual twist angle Δθ, and drives the EPS (steering) system 200 on the basis of the calculated motor current command value Iref so that the actual twist angle Δθ becomes the target twist angle Δθref.

The twist angle table 210 outputs the target twist angle Δθref depending on the inputted steered angle θh. That is, the twist angle table 210 outputs the target twist angle Δθref that gradually increases in the positive or negative direction as the steered angle θh increases in the positive or negative direction. It is desirable that the output characteristic is nonlinear as shown in FIG. 10, but it is possible that the output characteristic is linear.

Figure 11:
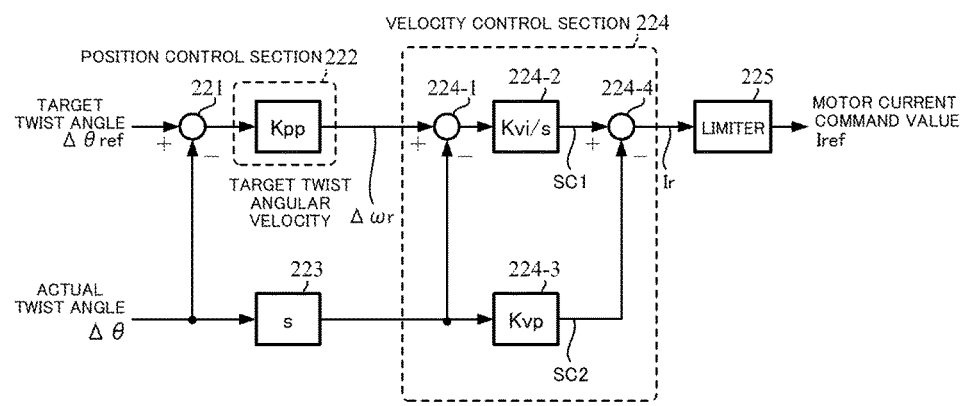
FIG. 11 is a block diagram showing a configuration example of a twist angle control section.

The twist angle control section 220, into which the target twist angle Δθref from the twist angle table 210 and the actual twist angle Δθ of the torsion bar are inputted, is, for example, configured as shown in FIG. 11.

That is, the target twist angle Δθref is addition-inputted into a subtracting section 221, the actual twist angle Δθ is subtraction-inputted into the subtracting section 221, at the same time, is inputted into a differentiating section 223 and is time-differentiated. The deviation between the target twist angle Δθref and the actual twist angle Δθ that is calculated in the subtracting section 221 is inputted into a position control section 222 having a position control gain Kpp, and is multiplied by the position control gain Kpp, so that a target twist angular velocity Δωr is obtained. The target twist angular velocity Δωr is addition-inputted into a subtracting section 224-1 within a velocity control section 224 of a next stage. The differential value of the differentiating section 223 is subtraction-inputted into the subtracting section 224-1 within the velocity control section 224, and, at the same time, is inputted into a proportional control calculating section 224-3 having a proportional control gain Kvp.

The subtraction result of the subtracting section 224-1 is inputted and integrated in an integral control calculating section 224-2 having an integral control gain Kvi, and the integral control result SC1 is addition-inputted into a subtracting section 224-4. Further, the proportional control result SC2 of the proportional control calculating section 224-3 is subtraction-inputted into the subtracting section 224-4. A maximum value of a current value Ir being the subtraction result (=SC1−SC2) in the subtracting section 224-4 is limited in a limiter 225, and the motor current command value Iref whose maximum value is limited is outputted. The motor current command value Iref becomes a command value of the EPS system 200, and the motor is driven.

Figure 12:
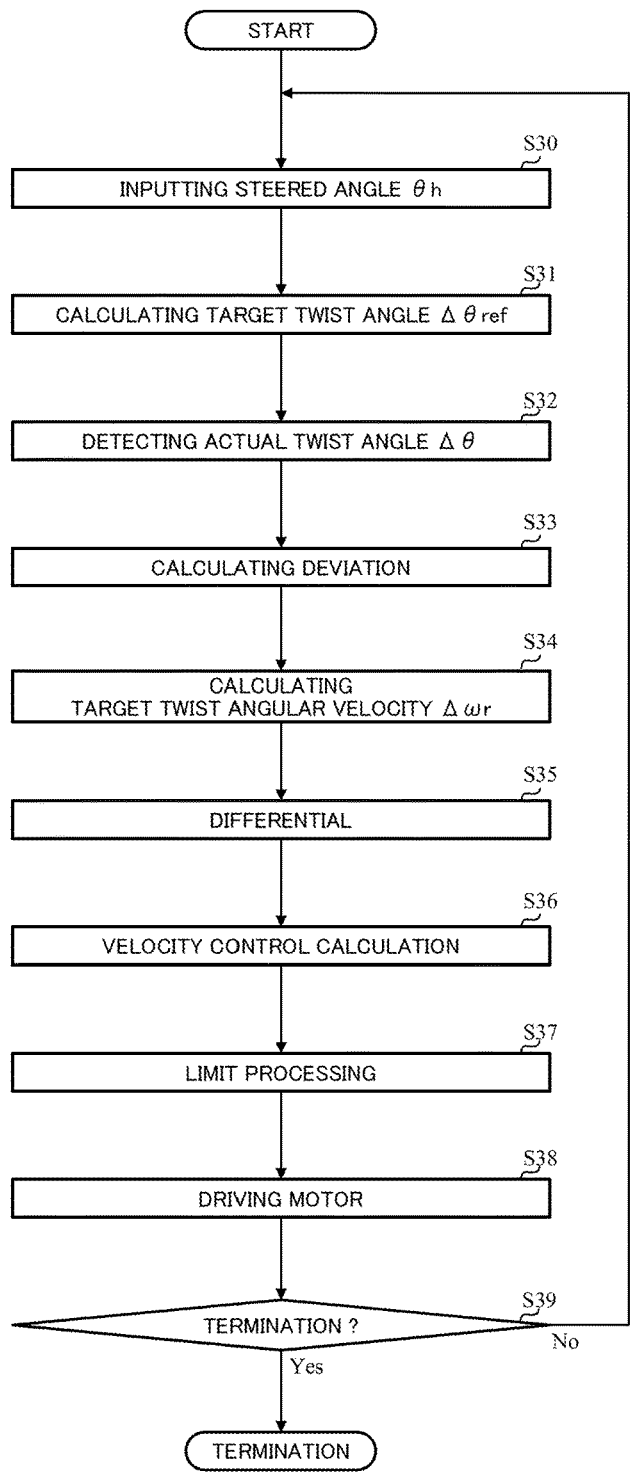
FIG. 12 is a flowchart showing an operating example (the second embodiment) of the present invention.

An operation example (the second embodiment) of such a configuration will be described with reference to a flowchart shown in FIG. 12.

First, the steered angle θh is inputted into the twist angle table 210 (Step S30). The twist angle table 210 calculates the target twist angle Δθref corresponding to the steered angle θh, and makes the target twist angle Δθref inputted into the subtracting section 221 (Step S31). Further, the actual twist angle Δθ is detected in the torsion bar within the EPS system 200 (Step S32), and is inputted into the subtracting section 221. The deviation between the target twist angle Δθref and the actual twist angle Δθ that is calculated in the subtracting section 221 (Step S33), the deviation is inputted into the position control section 222, and the target twist angular velocity Δωr is calculated by multiplying the deviation by the position control gain Kpp (Step S34).

Further, the actual twist angle Δθ from the EPS system 200 is time-differentiated in the differentiating section 223 (Step S35), this differential result and the target twist angular velocity Δωr from the position control section 222 are inputted into the velocity control section 224, and calculation of velocity control is performed (Step S36). The velocity control section 224 of the present embodiment has an I-P control structure, the maximum value of the current value Ir obtained by the I-P control is limited in the limiter 225 (Step S37), and the EPS system 200 is driven by means of the obtained motor current command value Iref (Step S38). The above operations are repeated until termination.

The velocity control section 224, first, calculates the deviation between the target twist angular velocity Δωr and the differential result from the differentiating section 223 in the subtracting section 224-1, multiplies the deviation by the integral control gain Kvi and integrates it, and addition-inputs the integral control result SC1 into the subtracting section 224-4. Further, the velocity control section 224 inputs the differential result into the proportional control calculating section 224-3, performs the proportional control calculation by multiplying the differential result by the proportional control gain Kvp, subtraction-inputs the proportional control result SC2 into the subtracting section 224-4, and obtains the current value Ir by calculating "the integral control result SC1 minus the proportional control result SC2" in the subtracting section 224-4.

Figure 13:
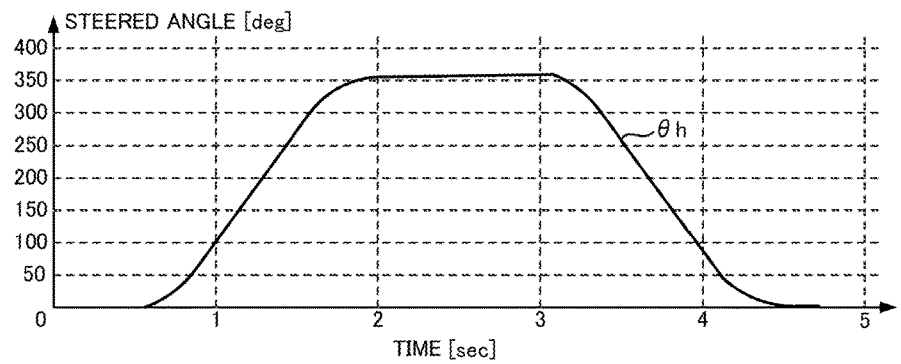
FIG. 13 is a characteristic diagram of a steered angle showing the operating example (the second embodiment) of the present invention.
Figure 14:
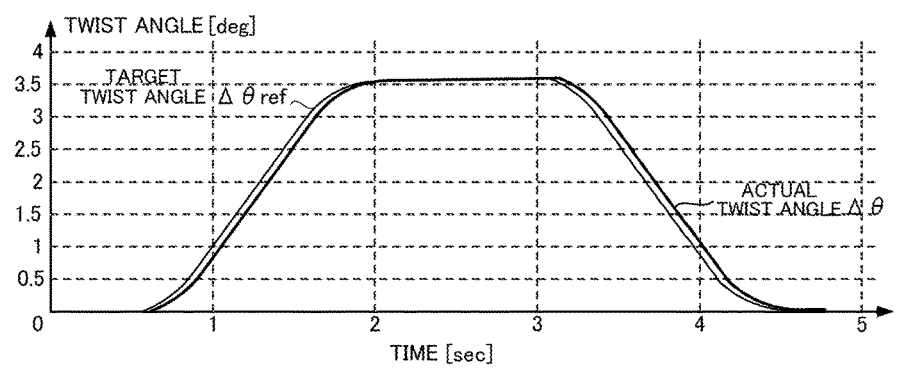
FIG. 14 is a characteristic diagram of a twist angle showing the operating example (the second embodiment) of the present invention.
Figure 15:
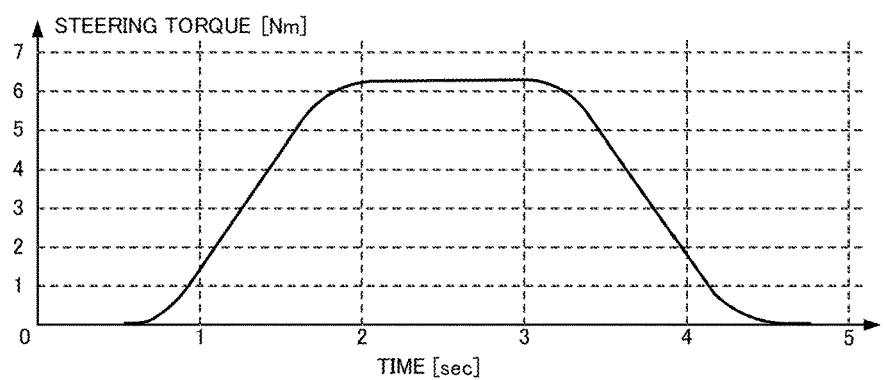
FIG. 15 is a characteristic diagram of a steering torque showing the operating example (the second embodiment) of the present invention.

FIGS. 13, 14 and 15 are characteristic diagrams showing the operating example of the second embodiment. In the case of changing the steered angle θh in accordance with the characteristic shown in FIG. 13, the target twist angle Δθref shown by a thin line in FIG. 14 is outputted from the twist angle table 210. The actual twist angle Δθ (shown by a thick line) operates so as to follow the target twist angle Δθref (shown by the thin line), and the result of this is that a steering torque occurring as hand feeling becomes as shown in FIG. 15.

Figure 16:
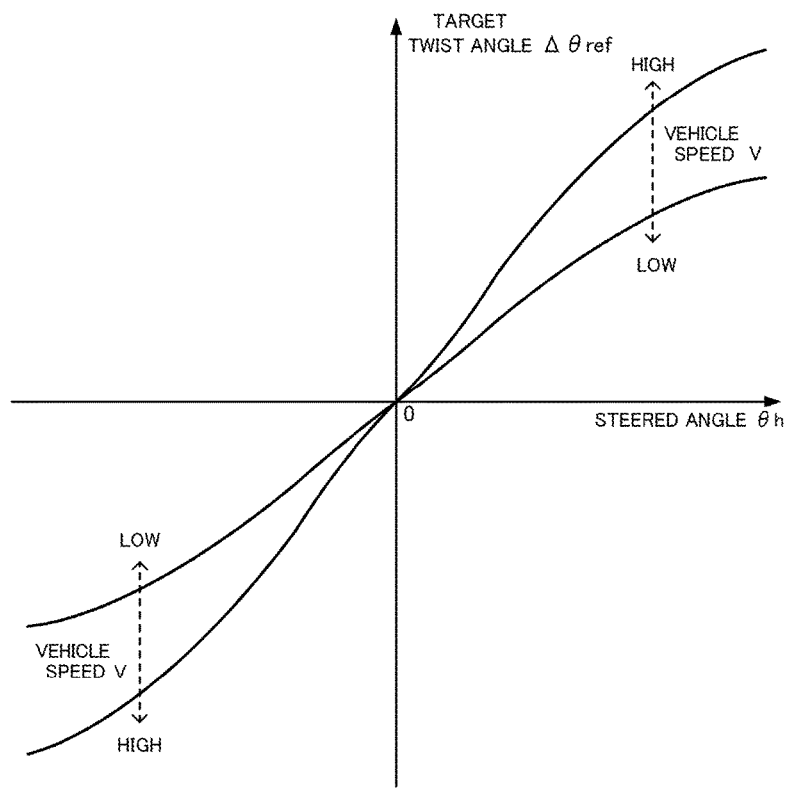
FIG. 16 is a characteristic diagram showing another example of a twist angle table.

Moreover, the above-mentioned twist angle table 210 has the characteristic corresponding to only the steered angle θh, but it is possible for the characteristic to be sensitive to the vehicle speed so as to change depending on the vehicle speed V. As shown in FIG. 16, in the case of the vehicle speed sensitive table, the characteristic is that the target twist angle Δθref, as a whole, increases as the vehicle speed V increases. Further, it is possible to provide a phase compensating section in the pre-stage or the post-stage of the twist angle table 210, and it is also possible to add a current command value of conventional assist control to the motor current command value of the twist angle control. Moreover, it is also possible to add a current command value of a SAT estimation value or a current command value for restraint of steering wheel vibration to the motor current command value of the twist angle control. The velocity control section can use not only the above-mentioned I-P control structure, but also PI control, P control, PID control, or PI-D control.

EXPLANATION OF REFERENCE NUMERALS 1 steering wheel
2 column shaft (steering shaft, handle shaft)
10 torque sensor
12 vehicle speed sensor
13 battery
20 motor
23 motor driving section
30, 100 control unit (ECU)
31 current command value calculating section
35 PI control section
36 PWM control section
110 torque system control section
111 current command value calculating section
120 motor system control section
122 disturbance estimating section
150 SAT compensation value calculating section
160 steering reaction compensation value calculating section
161 virtual spring constant gain section
162 virtual damper constant gain section
200 EPS (steering) system
210 twist angle table
220 twist angle control section
222 position control section
224 velocity control section

The invention claimed is:

1. An electric power steering apparatus that drives a motor based on a motor current command value, and assists and controls a steering system by driving and controlling said motor,
wherein
said electric power steering apparatus calculates said motor current command value by conducting calculation for twist angle control based on a deviation between a target twist angle being calculated by a twist angle table corresponding to a steered angle and an actual twist angle of said steering system, and controls said actual twist angle so as to follow said target twist angle corresponding to said steered angle.

2. The electric power steering apparatus according to claim 1, wherein
said twist angle table is vehicle speed sensitive.

3. The electric power steering apparatus according to claim 2, wherein
said calculation for twist angle control is performed by a subtracting section that obtains a deviation between said target twist angle and said actual twist angle, a position control section that outputs said target twist angular velocity by performing position control of said deviation, a differentiating section that differentiates said actual twist angle, and a velocity control section that inputs said target twist angular velocity and an output of said differentiating section and performs velocity control.

4. The electric power steering apparatus according to claim 1, wherein
said calculation for twist angle control is performed by a subtracting section that obtains a deviation between said target twist angle and said actual twist angle, a position control section that outputs said target twist angular velocity by performing position control of said deviation, a differentiating section that differentiates said actual twist angle, and a velocity control section that inputs said target twist angular velocity and an output of said differentiating section and performs velocity control.

5. The electric power steering apparatus according to claim 4, wherein
said velocity control section performs at least one among P control calculation, I control calculation and D control calculation, or combinations of them.

6. The electric power steering apparatus according to claim 5, wherein a limiter is provided in a post-stage of said velocity control section.

7. The electric power steering apparatus according to claim 4, wherein
a limiter is provided in a post-stage of said velocity control section.

8. The electric power steering apparatus according to claim 4, wherein
said electric power steering apparatus adds a current command value of assist control, a current command value of a self-aligning torque (SAT) estimation value or a current command value for restraint of steering wheel vibration to said motor current command value.

9. The electric power steering apparatus according to claim 5, wherein
said electric power steering apparatus adds a current command value of assist control, a current command value of a self-aligning torque (SAT) estimation value or a current command value for restraint of steering wheel vibration to said motor current command value.

10. The electric power steering apparatus according to claim 1, wherein
said electric power steering apparatus adds a current command value of assist control, a current command value of a self-aligning torque (SAT) estimation value or a current command value for restraint of steering wheel vibration to said motor current command value.

* * * * *